(12) United States Patent
Ishida et al.

(10) Patent No.: US 9,728,924 B2
(45) Date of Patent: Aug. 8, 2017

(54) ACTUATOR DEVICE

(71) Applicant: Aisin Seiki Kabushiki Kaisha, Kariya-shi (JP)

(72) Inventors: Toshihiko Ishida, Niwa-gun (JP); Wataru Otake, Kasugai (JP); Fumiaki Togitani, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 372 days.

(21) Appl. No.: 14/614,721

(22) Filed: Feb. 5, 2015

(65) Prior Publication Data
US 2015/0229084 A1 Aug. 13, 2015

(30) Foreign Application Priority Data

Feb. 7, 2014 (JP) .................. 2014-022589

(51) Int. Cl.
*H02K 7/10* (2006.01)
*H01R 39/08* (2006.01)
*H02K 7/116* (2006.01)
*H02K 11/38* (2016.01)
*H02K 11/40* (2016.01)

(52) U.S. Cl.
CPC ........... *H01R 39/08* (2013.01); *H02K 7/1166* (2013.01); *H02K 11/38* (2016.01); *H02K 11/40* (2016.01)

(58) Field of Classification Search
CPC ...... H02K 7/116; H02K 5/225; H02K 7/1166; H02K 11/40

USPC ........................... 310/71–72, 78, 83, 99, 219
See application file for complete search history.

(56) References Cited

U.S. PATENT DOCUMENTS

| | | | | |
|---|---|---|---|---|
| 5,747,901 | A * | 5/1998 | Harada | H02K 11/024 310/58 |
| 2004/0012296 | A1* | 1/2004 | Sakai | H01R 39/383 310/239 |
| 2006/0043803 | A1* | 3/2006 | Yagi | H02K 7/1166 310/68 B |
| 2006/0181166 | A1* | 8/2006 | Saito | H02K 11/38 310/75 R |
| 2008/0048507 | A1* | 2/2008 | Kanda | H02K 5/148 310/420 |
| 2008/0110717 | A1 | 5/2008 | Toyama et al. | |
| 2009/0167105 | A1* | 7/2009 | Pauli | H02K 5/225 310/239 |

FOREIGN PATENT DOCUMENTS

| | | |
|---|---|---|
| JP | 4760204 | 8/2011 |
| JP | 2013-144882 | 7/2013 |

* cited by examiner

*Primary Examiner* — Thanh Lam
(74) *Attorney, Agent, or Firm* — Oblon, McClelland, Maier & Neustadt, L.L.P.

(57) ABSTRACT

An actuator device includes: a motor that is a driving source; a reduction gear that decelerates rotation of the motor; an accommodating member that accommodates the reduction gear; and a conductive member that is disposed integrally with the accommodating member and is in sliding contact with the reduction gear so that a ground circuit capable of grounding the reduction gear is formed.

9 Claims, 5 Drawing Sheets

ACTUATOR DEVICE

CROSS REFERENCE TO RELATED APPLICATIONS

This application is based on and claims priority under 35 U.S.C. §119 to Japanese Patent Application 2014-022589, filed on Feb. 7, 2014, the entire contents of which are incorporated herein by reference.

TECHNICAL FIELD

This disclosure relates to an actuator device.

BACKGROUND DISCUSSION

In general, an actuator device that uses a motor as a driving source is provided with a decelerator which decelerates rotation of the motor. For example, a worm & wheel is used in a deceleration mechanism of an actuator device according to Japanese Patent No. 4760204. A wheel gear (worm wheel) as a reduction gear thereof is accommodated in an accommodating member with an axial-direction end surface being in sliding contact with a facing surface.

In addition, the reduction gear and the accommodating member are formed of a resin in the actuator device. Since a resin is used as the material, a high degree of freedom can be ensured for molding. Also, a required strength can be ensured and weight reduction can be achieved.

However, according to the configuration of the related art described above, the sliding contact between the reduction gear and the accommodating member may generate static electricity. Also, the static electricity with which the reduction gear is charged may be discharged to electronic components in the accommodating member beyond an air gap. In this respect, there still remains room for improvement.

SUMMARY

Thus, a need exists for an actuator device which is not suspectable to the drawback mentioned above.

It is preferable that an actuator device according to an aspect of this disclosure includes a motor that is a driving source, a reduction gear that decelerates rotation of the motor, an accommodating member that accommodates the reduction gear, and a conductive member that is disposed integrally with the accommodating member and is in sliding contact with the reduction gear so that a ground circuit capable of grounding the reduction gear is formed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of an actuator device that is applied to a power slide door device will be described with reference to accompanying drawings.

Figure 1:
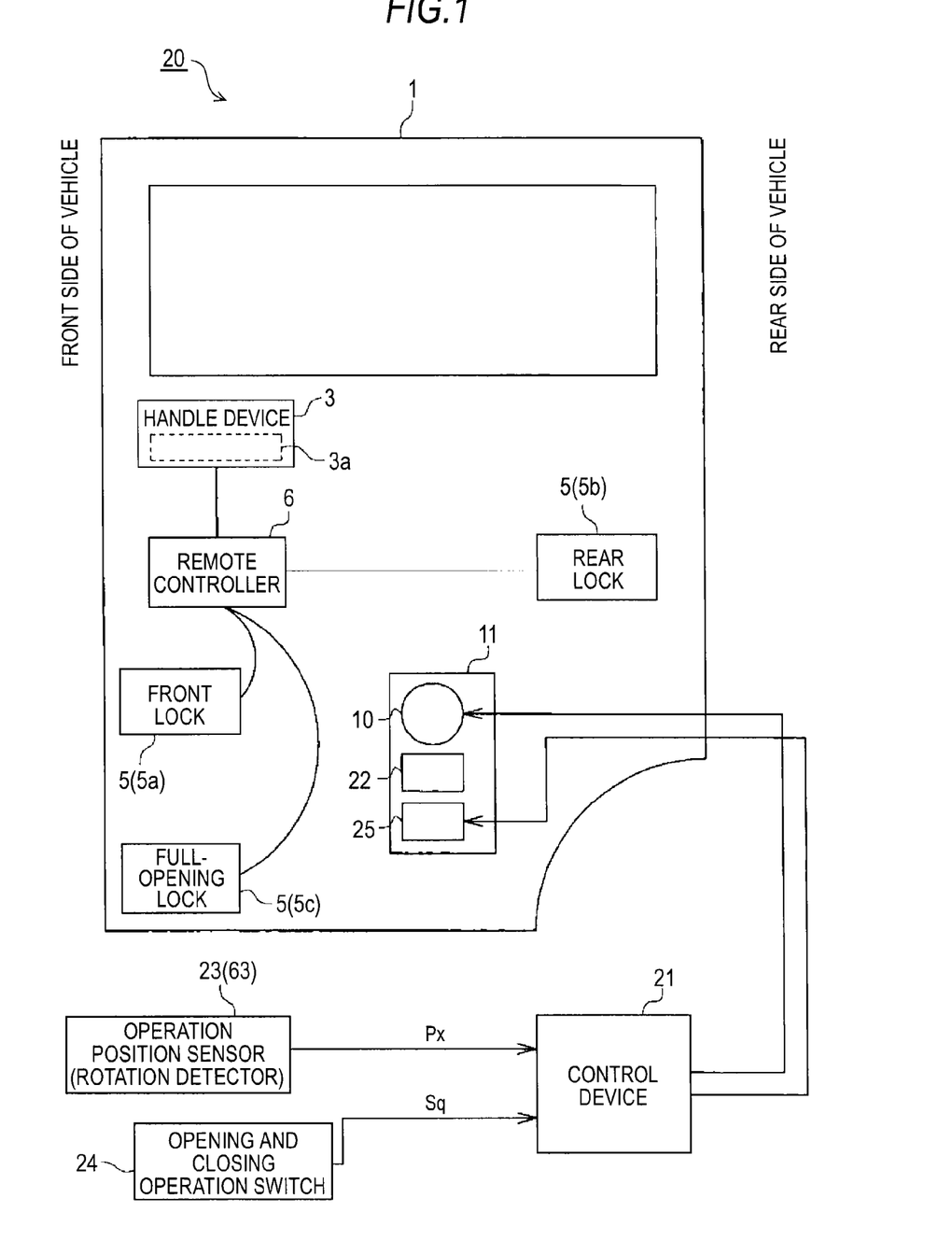
FIG. 1 is a schematic block diagram illustrating a configuration of a power slide door device.

As illustrated in FIG. 1, a slide door 1 as an opening and closing body that is disposed in a vehicle is configured to be capable of opening and closing an opening portion (not illustrated) disposed on a body side surface of the vehicle by moving in a front-back direction of the vehicle. Specifically, the slide door 1 achieves a closed state where the opening portion of the body is closed when the slide door 1 is moved to a front side (left side in the drawing) of the vehicle and achieves an open state where getting in and out via the opening portion are allowed when the slide door 1 is moved to a rear side (right side in the drawing) of the vehicle. A handle device 3 that is operated for opening and closing the slide door 1 is disposed in the slide door 1.

More specifically, a front lock 5a and a rear lock 5b (full-closing locks) that restrain the slide door 1 at a fully closed position are disposed in the slide door 1. In addition, a full-opening lock 5c that restrains the slide door 1 at a fully open position is disposed in the slide door 1. Each of the lock mechanisms (latch mechanisms) 5 is mechanically linked to the handle device 3 via a transmission member such as a wire that extends from a remote controller 6.

In other words, an operation input for the handle device 3 is transmitted to each of the lock mechanisms 5 based on operations of operation units (outer handle and inner handle) 3a that are disposed on an exterior surface and an interior surface of the slide door 1. When the restraint on the slide door 1 is released based on operating forces thereof, the slide door 1 is allowed to be moved in an opening direction from the fully closed position or is allowed to be moved in a closing direction from the fully open position.

In addition, a power slide door device 20 that is capable of performing opening and closing operations on the slide door 1 with an actuator device 11 using a motor 10 as a driving source is disposed in the vehicle.

More specifically, the motor 10 of the actuator device 11 rotates based on drive electric power that is supplied by a control device 21 in this embodiment. In other words, an operation of the actuator device 11 is controlled by the drive electric power supply that is executed by the control device 21. In addition, the actuator device 11 is provided with a deceleration mechanism 22 that decelerates and outputs the rotation of the motor 10. The power slide door device 20 according to this embodiment is capable of performing the opening and closing operations on the slide door 1 by transmitting the rotation of the motor 10 decelerated by the deceleration mechanism 22 to a driving unit (not illustrated) of the slide door 1.

More specifically, an operation position sensor 23 that detects operation positions (opening and closing positions) Px of the slide door 1 is connected to the control device 21 in this embodiment. In addition, an operation request signal Sq that requests the opening and closing operations of the slide door 1 by the driving of the motor is input into the control device 21 when the handle device 3 and a portable device (remote control key) or an opening and closing operation switch 24 which is disposed in a passenger compartment or the like are operated. The control device 21 is configured to control the operation of the actuator device 11 based on the input of the operation request signal Sq and the operation positions Px of the slide door 1 so that the slide door 1 is subjected to the opening and closing operations (or is stopped).

In addition, the actuator device 11 according to this embodiment is provided with an electromagnetic clutch 25 that is capable of disconnecting (connecting or blocking) a torque transmission path of the motor 10 which is the driving source. In this embodiment, an operation of the electromagnetic clutch 25 is also controlled by the control device 21. For example, the control device 21 controls the electromagnetic clutch 25 to be in an open state in a case where the slide door 1 is manually opened and closed. In this embodiment, the torque transmission path of the motor 10 is blocked (cut) in this manner so that the slide door 1 is configured to be smoothly operated even during the manual operation.

Actuator Device

Next, a configuration of the actuator device according to this embodiment will be described.

As illustrated in FIGS. 2 to 5, the actuator device 11 according to this embodiment is provided with an accommodating member 30 that accommodates the deceleration mechanism 22 and the electromagnetic clutch 25. Specifically, the accommodating member 30 is provided with a cylindrical portion 31 that has a flat and substantially cylindrical outer shape. The deceleration mechanism 22 and the electromagnetic clutch 25 are accommodated in the cylindrical portion 31. In addition, the accommodating member 30 is provided with a rectangular box portion 32 that has a flat and substantially box-shaped outer shape and extends radially outside to a side (left side in FIGS. 2 and 3) from the cylindrical portion 31. A circuit board 33 on which an electronic control circuit that constitutes the control device 21, the operation position sensor 23, and the like is mounted is accommodated in the rectangular box portion 32.

Figure 3:
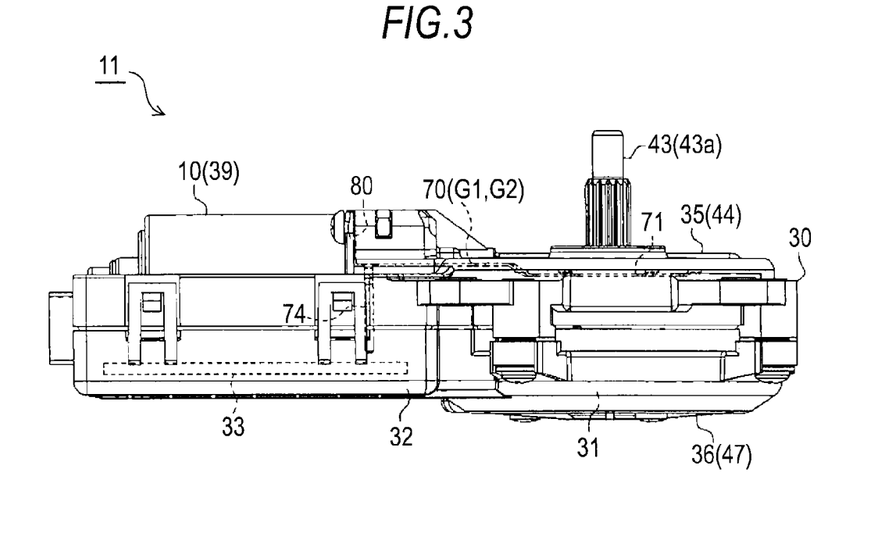
FIG. 3 is a plan view of the actuator device.
Figure 4:
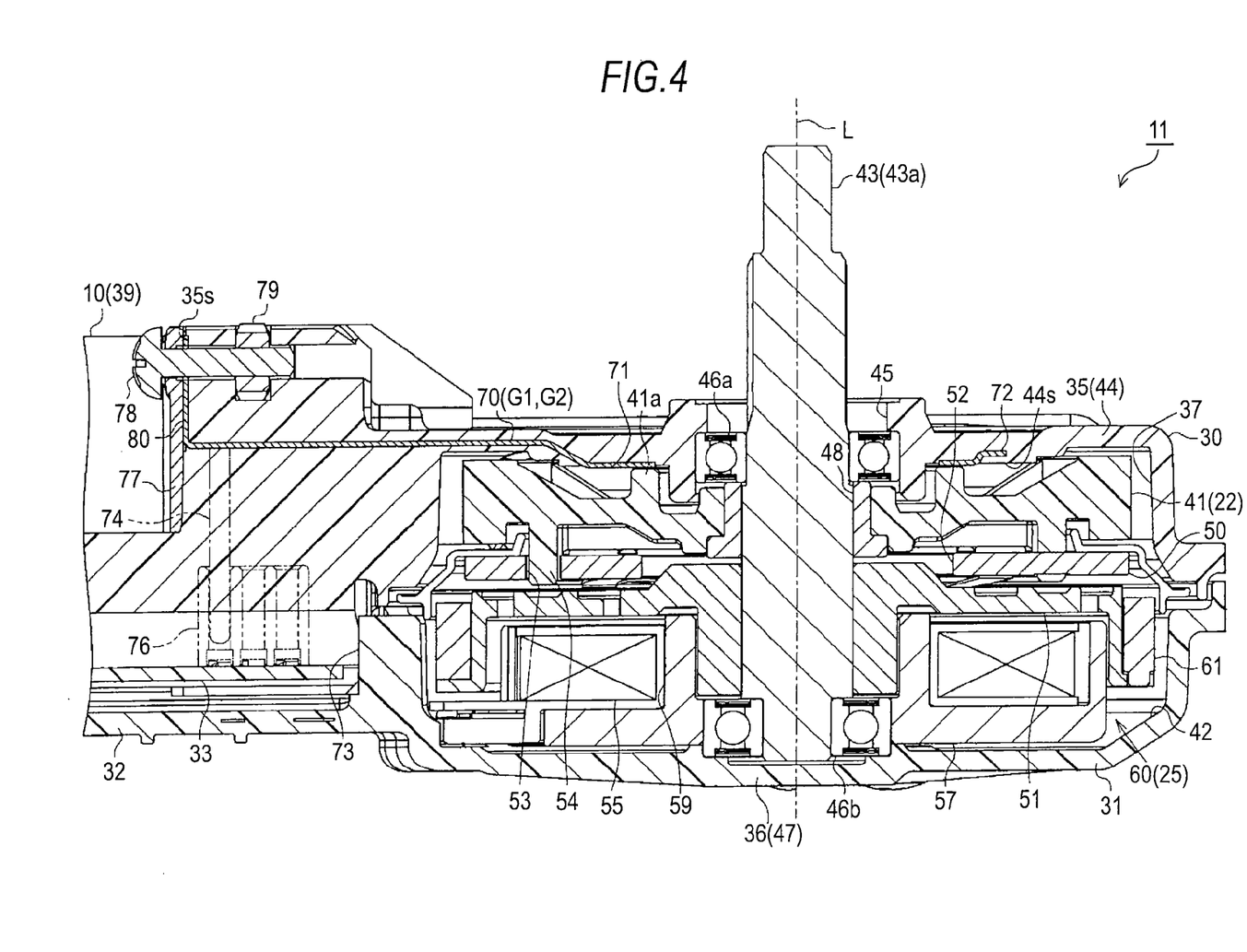
FIG. 4 is a cross-sectional view of the actuator device (taken along line IV-IV in FIG. 2)

More specifically, the accommodating member 30 according to this embodiment is formed by assembling a first accommodating member 35 and a second accommodating member 36 that are formed by dividing the cylindrical portion 31 and the rectangular box portion 32 in a thickness direction (vertical direction in FIGS. 3 and 4). In this embodiment, the first accommodating member 35 and the second accommodating member 36 are formed of a resin. In this embodiment, the first accommodating member 35 side of the cylindrical portion 31 that is divided is a gear accommodating chamber 37 accommodating the deceleration mechanism 22.

Figure 2:
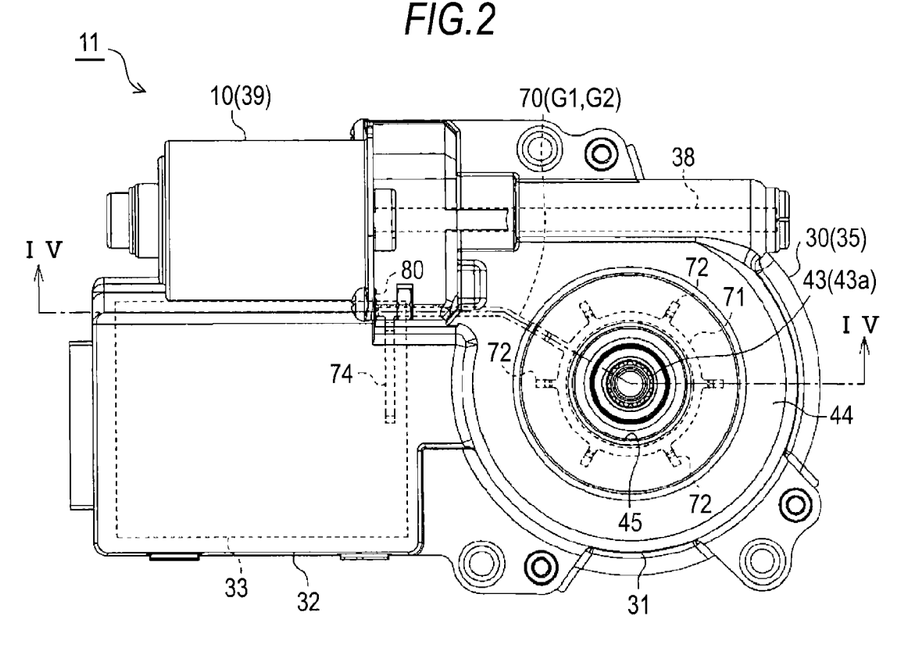
FIG. 2 is a side view of an actuator device.
Figure 5:
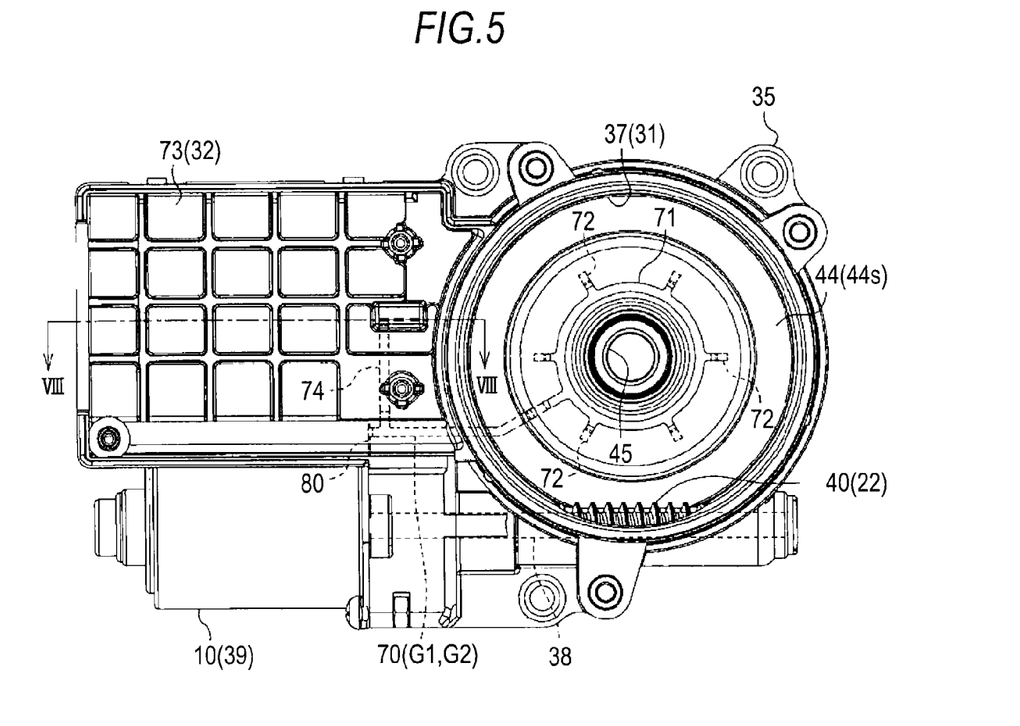
FIG. 5 is a side view of a first accommodating member.

Specifically, as illustrated in FIGS. 2 and 5, the motor 10 of the actuator device 11 according to this embodiment is assembled with the accommodating member 30 with a motor shaft 38 of the motor 10 being inserted into the gear accommodating chamber 37 from a side of the cylindrical portion 31. A motor yoke 39 of the motor 10 is held on a side of the accommodating member 30 while being substantially in parallel to the rectangular box portion 32.

In addition, a worm gear 40 is fixed to the motor shaft 38 that is inserted into the gear accommodating chamber 37 in this embodiment. In other words, a known worm & wheel is adopted for the deceleration mechanism 22 in this embodiment. As illustrated in FIG. 4, a wheel gear (worm wheel) 41 that is engaged with the worm gear 40 is rotatably accommodated in the gear accommodating chamber 37.

More specifically, the second accommodating member 36 side of the cylindrical portion 31 is a clutch accommodating chamber 42 that accommodates the electromagnetic clutch 25 in this embodiment. In addition, an output shaft 43 is disposed in the cylindrical portion 31 across the clutch accommodating chamber 42 and the gear accommodating chamber 37. The electromagnetic clutch 25 according to this embodiment is interposed between the output shaft 43 and the wheel gear 41 as a reduction gear, and thus the torque transmission path of the motor 10 can be disconnected (connected and disconnected) by an operation thereof.

Specifically, a through-hole 45 that communicates with an inner portion of the cylindrical portion 31 is disposed in a bottom wall portion 44 of the first accommodating member 35. The output shaft 43 is rotatably and axially supported, in a state where a tip 43a protrudes from the through-hole 45, by a bearing 46a that is disposed in the bottom wall portion 44 of the first accommodating member 35 and a bearing 46b that is disposed in a bottom wall portion 47 of the second accommodating member 36.

The wheel gear 41 according to this embodiment is formed of a resin. In the wheel gear 41, an annular slide bearing 48 is disposed at a central part that is the center of rotation of the wheel gear 41. When the output shaft 43 is inserted into the slide bearing 48, the wheel gear 41 is rotatably and axially supported in a state where an axial-direction end portion 41a of the wheel gear 41 is in sliding contact with the bottom wall portion 44 of the first accommodating member 35.

The electromagnetic clutch 25 according to this embodiment is provided with an armature 50 that is supported by the wheel gear 41 to be movable in an axial direction and rotates integrally with the wheel gear 41 and a rotor 51 that is fixed to the output shaft 43 and is juxtaposed coaxially with the armature 50 in a state of being capable of relative rotation.

The armature 50 according to this embodiment has a circular hole 52 in a central portion and has a substantially disk-shaped outer shape. In addition, the armature 50 is formed of an iron-based magnetic material. The armature 50 is juxtaposed coaxially with the wheel gear 41 with the output shaft 43 being inserted into the circular hole 52.

In addition, the armature 50 has a plurality of through-holes 53 that are formed in a circumferential direction to surround the circular hole 52. A plurality of supporting protrusion portions 54 that extend in the axial direction along the output shaft 43 which is an axis of rotation L of the wheel gear 41 to be inserted into the respective through-holes 53 of the armature 50 are disposed in the wheel gear 41. Because the armature 50 is supported by the supporting protrusion portions 54, the armature 50 can rotate integrally with the wheel gear 41 as a driving member and can be moved in the axial direction.

In this embodiment, the rotor 51 is formed of an iron-based magnetic material as is the case with the armature 50. In addition, in the clutch accommodating chamber 42, an electromagnetic coil 55 is disposed at an axial-direction position at which the rotor 51 is pinched between the armature 50 and the electromagnetic coil 55. A yoke 57 that surrounds the electromagnetic coil 55 is disposed in the clutch accommodating chamber 42.

Specifically, the yoke 57 according to this embodiment has a substantially annular outer shape and is formed of an iron-based magnetic material. In addition, the yoke 57 has an annular groove 59 that is open toward the rotor 51 side. The electromagnetic coil 55 is held by the yoke 57 in a state of being wound in the annular groove 59 that has a substantially U-shaped cross section.

A magnetic circuit is formed in the yoke 57 and the rotor 51 arranged in the vicinity of the electromagnetic coil 55 when the electromagnetic coil 55 is energized. The electromagnetic clutch 25 according to this embodiment is provided with an electromagnet 60 that is capable of generating magnetic attraction which axially moves the armature 50 to the rotor 51 side. Because the armature 50 and the rotor 51 are pressed against each other based on the electromagnetic attraction, the wheel gear 41 that rotates integrally with the armature 50 and the output shaft 43 that rotates integrally with the rotor 51 can be configured to be linked therebetween to be capable of torque transmission.

In addition, the magnetic attraction of the electromagnet 60 disappears when the energization of the electromagnetic coil 55 is stopped. In this manner, the electromagnetic clutch 25 according to this embodiment is put into the open state where the armature 50 and the rotor 51 are capable of relative rotation, and thus the torque transmission path of the motor 10 that is the driving source can be blocked.

Figure 6:
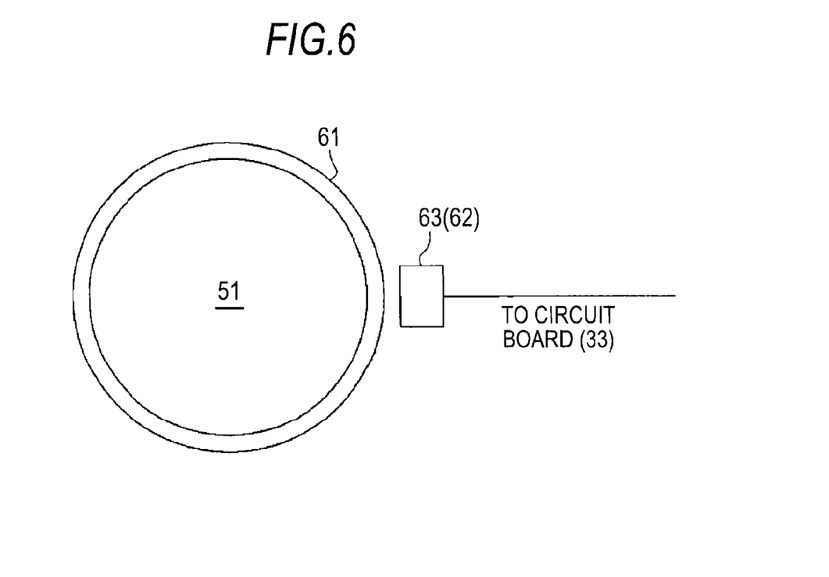
FIG. 6 is a schematic explanatory drawing illustrating a rotation detector that is disposed in the vicinity of a rotor.

As illustrated in FIGS. 4 and 6, a magnet 61 is fixed to an outer circumference of the rotor 51 in this embodiment. In addition, in the accommodating member 30, a magnetic detection element 62 is disposed at a position facing the magnet 61. Specifically, the magnetic detection element 62 is arranged at the position facing the magnet 61 radially outside the rotor 51. A rotation detector (Hall IC) 63 that is capable of detecting rotation of the rotor 51 based on an output signal of the magnetic detection element 62 is formed in this embodiment.

In this embodiment, the operation position sensor 23 (refer to FIG. 1) counts the rotation of the rotor 51 that is detected by the rotation detector 63. The operation positions Px of the slide door 1 are configured to be detected based on the counted number.

Charge-suppressing Structure

Next, a charge-suppressing structure of the actuator device according to this embodiment will be described.

As illustrated in FIGS. 2 to 5, the actuator device 11 according to this embodiment is provided with a conductive member 70 that forms a ground circuit G1 which is disposed integrally with the accommodating member 30 and is capable of grounding the wheel gear 41 by being in sliding contact with the wheel gear 41.

More specifically, the conductive member 70 according to this embodiment is formed by performing plasticity processing (press working) on a metallic plate material. In addition, as illustrated in FIGS. 4 and 5, the conductive member 70 is embedded in the first accommodating member 35 that forms the gear accommodating chamber 37 as described above by insert molding. Specifically, the conductive member 70 is embedded in the bottom wall portion 44 of the first accommodating member 35 across the cylindrical portion 31 side and the rectangular box portion 32. According to this embodiment, one end of the conductive member 70 on the cylindrical portion 31 side that is exposed to an inner portion of the gear accommodating chamber 37 is in sliding contact with the wheel gear 41 accommodated in the gear accommodating chamber 37.

As illustrated in FIG. 5, the conductive member 70 according to this embodiment has an annular portion 71, which is formed into a substantially annular shape, on the one end on the cylindrical portion 31 side. The conductive member 70 is embedded in the bottom wall portion 44 of the first accommodating member 35 with the annular portion 71 being exposed to a facing surface 44s facing the wheel gear 41.

Figure 7:
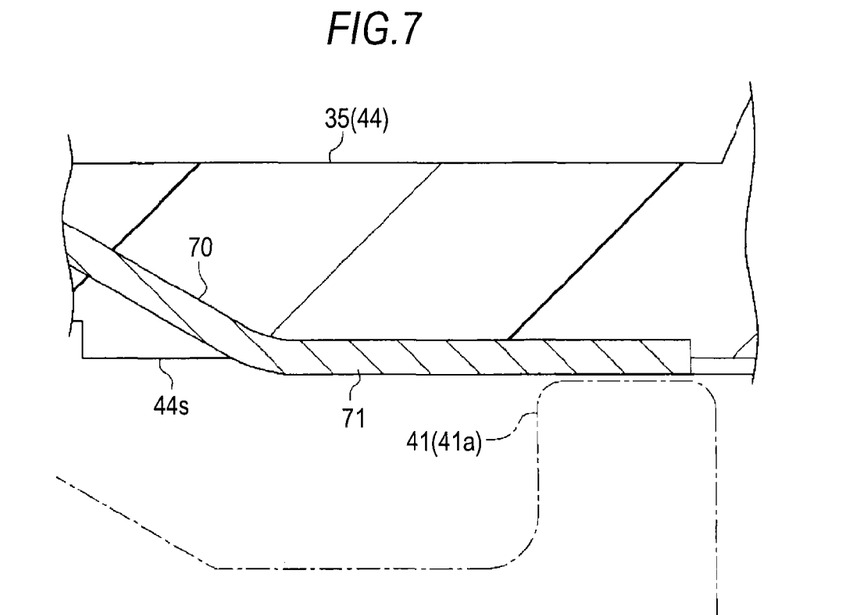
FIG. 7 is an enlarged view of a conductive member that is embedded in the first accommodating member.

As illustrated in FIG. 4, the conductive member 70 according to this embodiment is configured for the annular portion 71 that is juxtaposed in the axial direction to face the wheel gear 41 to be in direct sliding contact with the axial-direction end portion 41 a of the wheel gear 41 which is in sliding contact with the accommodating member 30 (bottom wall portion 44 of the first accommodating member 35). Specifically, the annular portion 71 is juxtaposed substantially coaxially with the wheel gear 41. As illustrated in FIG. 7, the conductive member 70 is embedded in the bottom wall portion 44 of the first accommodating member 35 in a state where the annular portion 71 protrudes from the facing surface 44s facing the wheel gear 41.

As illustrated in FIG. 5, the conductive member 70 according to this embodiment has a plurality of (six at equal intervals in this embodiment) supporting claws 72 that extend radially outside from the annular portion 71. In this embodiment, each of the supporting claws 72 is embedded in the bottom wall portion 44, and thus the annular portion 71 that is in sliding contact with the wheel gear 41 can be stably supported.

Figure 8:
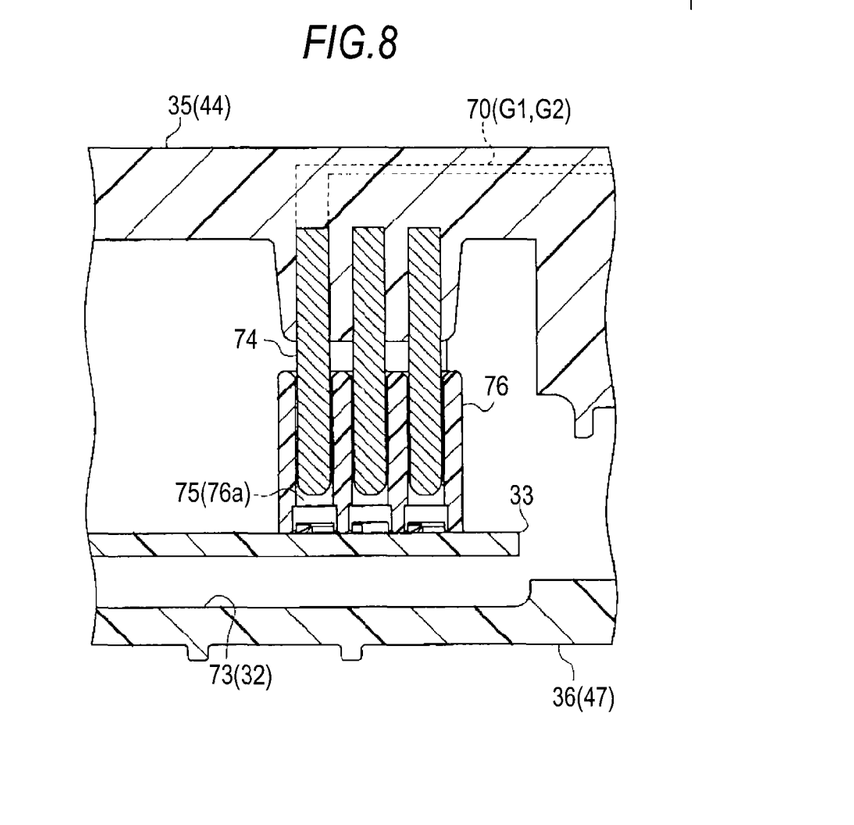
FIG. 8 is a cross-sectional view of the actuator device (taken along line VIII-VIII in FIG. 5).

As illustrated in FIGS. 2 to 5, a ground connection section 74 is formed on an end portion side of the conductive member 70 that extends to the rectangular box portion 32 side. In this embodiment, the ground connection section 74 is configured to protrude in a substrate accommodating chamber 73 that is formed in the rectangular box portion 32 as illustrated in FIG. 8. In addition, a conductive portion 75 for grounding, which is electrically connected to a body ground (GND), is disposed on the circuit board 33 that is accommodated in the substrate accommodating chamber 73. In this embodiment, the ground connection section 74 of the conductive member 70 is connected to the conductive portion 75 for grounding so that the ground circuit G1 that is capable of grounding the wheel gear 41 which is in sliding contact with the annular portion 71 is formed.

A connector portion 76 that has a plurality of terminal insertion portions is disposed on the circuit board 33 according to this embodiment. In addition, the ground connection section 74 of the conductive member 70 has a terminal-shaped outer shape to correspond to the terminal insertion portions. In this embodiment, a first terminal insertion portion 76a of the connector portion 76 is the conductive portion 75 for grounding.

As illustrated in FIGS. 2 and 4, the motor 10 according to this embodiment is configured for a flange portion 77 that is disposed at an open end of the motor yoke 39 to be fastened to the accommodating member 30 by a bolt 78 (and a nut 79). In addition, the conductive member 70 according to this embodiment has a motor connection section 80 that is exposed to a fastening surface 35s for the motor yoke 39. In this embodiment, a ground circuit G2 that is capable of grounding the motor yoke 39 is formed when an electrically connected state is established with the motor connection section 80 being in contact with the flange portion 77.

Next, an effect of the conductive member 70 that has the above-described configuration will be described.

Static electricity is generated as the wheel gear 41 formed of a resin and the accommodating member 30 (bottom wall portion 44 of the first accommodating member 35) are in sliding contact with each other. Then, the wheel gear 41 is charged with the static electricity, and the static electricity may be discharged to electronic components such as the rotation detector 63 disposed in the accommodating member 30 beyond an air gap.

However, in the actuator device 11 according to this embodiment, the conductive member 70 that is disposed integrally with the accommodating member 30 abuts against the wheel gear 41 so that the wheel gear 41 is grounded. Accordingly, static electric charging can be suppressed.

The following effects can be achieved by this embodiment.

(1) The actuator device 11 is provided with the motor 10 that is the driving source, the wheel gear 41 as the reduction gear that decelerates the rotation of the motor 10, and the accommodating member 30 that accommodates the wheel gear 41. In addition, the actuator device 11 is provided with the conductive member 70 that is disposed integrally with the accommodating member 30. When the conductive member 70 is in sliding contact with the wheel gear 41, the ground circuit G1 that is capable of grounding the wheel gear 41 is formed.

According to this configuration, the static electric charging can be effectively suppressed by a simple configuration. As a result, the possibility of the static electricity with which the wheel gear 41 is charged being discharged to the electronic components arranged in the accommodating member 30 beyond the air gap can be reduced. Since the conductive member 70 is disposed integrally with the accommodating member 30, an assembly operation can be more efficient than in a case where, for example, a lead wire constituting a part of a conductive member is assembled out of an accommodating member later.

(2) The conductive member 70 is provided with the annular portion 71 that is juxtaposed in the axial direction to face the wheel gear 41. According to this configuration, the conductive member 70 can be in direct sliding contact with the axial-direction end portion 41a of the wheel gear 41 that is in sliding contact with the accommodating member 30. In addition, the wheel gear 41 can be in sliding contact with any part of the annular portion 71 even in a case where tilting occurs in the wheel gear 41. As a result, the static electric charging can be suppressed more effectively.

(3) The annular portion 71 is supported by the bottom wall portion 44 of the first accommodating member 35 in a state of protruding from the facing surface 44s facing the wheel gear 41. In other words, the annular portion 71 is a protruding portion that protrudes to the wheel gear 41 side from the facing surface 44s on the accommodating member 30 side, and thus the conductive member 70 can be in sliding contact with the wheel gear 41 more stably. As a result, the static electric charging can be suppressed more effectively.

(4) The conductive member 70 is provided with the ground connection section 74 that protrudes in the substrate accommodating chamber 73. When the ground connection section 74 is connected to the conductive portion 75 for grounding that is disposed on the circuit board 33, the ground circuit G1 that is capable of grounding the wheel gear 41 which is in sliding contact with the annular portion 71 is formed.

According to this configuration, the formation of the ground circuit G1 that uses the conductive member 70 can be facilitated.

(5) The conductive member 70 has the motor connection section 80 that is exposed to the fastening surface 35s for the motor yoke 39. When the motor connection section 80 is in contact with the flange portion 77, the ground circuit G2 that is capable of grounding the motor yoke 39 is formed.

According to this configuration, no wiring handling is required in grounding the motor 10. Accordingly, the number of components can be reduced and manufacturing processes can be simplified.

(6) The conductive member 70 is embedded in the accommodating member 30 (first accommodating member 35), by insert molding, with exposed portions (annular portion 71, ground connection section 74, and motor connection section 80).

According to this configuration, the conductive member 70 can be held in the accommodating member 30 with ease and reliability. In addition, integrity thereof increases, and thus positioning is facilitated during the assembly. Accordingly, the operation efficiency can be improved.

(7) The rotation detector 63 is provided in the accommodating member 30. According to this configuration, the static electricity with which the wheel gear 41 is charged may be discharged to the rotation detector 63 beyond the air gap. Accordingly, the charge-suppressing structure of (1) to (6) above is applied to this configuration so that a more significant effect can be achieved.

The embodiment described above may be modified as follows.

The actuator device 11 is used in the power slide door device 20 in the embodiment described above. However, the actuator device may be used for other applications, examples of which include other vehicular opening and closing body driving devices for opening and closing opening and closing bodies other than the slide door 1 such as back doors, luggage doors, and trunk lids disposed in rear portions of vehicles. Also, the actuator device may be used for non-vehicular applications.

The actuator device 11 is provided with the electromagnetic clutch 25 in the embodiment described above. However, the actuator device may be configured to be provided with a mechanical clutch (for example, one-way clutch). Also, the actuator device may be applied to those without such a clutch mechanism.

The worm & wheel is used in the deceleration mechanism 22 and the wheel gear 41 constitutes the reduction gear that is in sliding contact with the accommodating member 30 in the embodiment described above. However, the configuration of the deceleration mechanism 22 may be changed as appropriate without having to be limited thereto. Also, the reduction gear may be replaced as appropriate with, for example, a spur gear or a worm gear.

In the embodiment described above, the conductive member 70 is embedded in the accommodating member 30 with the exposed portions (annular portion 71, ground connection section 74, and motor connection section 80) by insert molding. However, the conductive member 70 may be configured to be disposed integrally with the accommodating member 30 by, for example, engagement, adhesion, or fastening without having to be limited thereto.

In the embodiment described above, the conductive member 70 is formed by performing the plasticity processing (press working) on the metallic plate material. However, the conductive member 70 may be configured to be formed of, for example, a wire rod or a conductive film without having to be limited thereto.

Simply "(the axial-direction end portion 41a of) the wheel gear 41 is in sliding contact with the bottom wall portion 44 of the first accommodating member 35" in the embodiment described above. However, if the static electricity may be generated due to the sliding contact therebetween, the charge-suppressing structure described above may be applied regardless of the sliding contact state (normal sliding contact or intermittent sliding contact).

In the embodiment described above, the conductive member 70 is embedded in the bottom wall portion 44 of the first accommodating member 35 with the annular portion 71 being exposed to the facing surface 44s facing the wheel gear 41 and the annular portion 71 is supported by the bottom wall portion 44 of the first accommodating member 35 in a state of protruding from the facing surface 44s facing the wheel gear 41. However, the shapes and number of sliding contact portions on the conductive member 70 side for the reduction gear (wheel gear 41) may be changed as appropriate without having to be limited thereto. In other words, the shape of the sliding contact portion does not necessarily have to be annular. Also, a plurality of the sliding contact portions may be present with, for example, the conductive member 70 being provided with a plurality of sliding contact pieces that are arranged about the axis of rotation of the wheel gear 41. In addition, the sliding contact portion may be substantially flush with the facing surface 44s. Also, the sliding contact portion may be configured to be in sliding contact with the axial-direction end portion 41a of the wheel gear 41 while protruding in the accommodating member 30 from a site on the accommodating member 30 side other than the facing surface 44s.

A position where (the annular portion 71 of) the conductive member 70 is in sliding contact with the wheel gear 41 may be changed. In other words, the position where the conductive member 70 is in sliding contact does not necessarily have to be the axial-direction end portion 41a of the wheel gear 41. The conductive member 70 may be configured to be in sliding contact with any part other than the part where the wheel gear 41 is in sliding contact with the accommodating member 30 if a charge-suppressing effect can be achieved at the site.

In the embodiment described above, the ground connection section 74 of the conductive member 70 is connected to the conductive portion 75 for grounding disposed on the circuit board 33 so that the ground circuit G1 that is capable of grounding the wheel gear 41 which is in sliding contact with the conductive member 70 is formed. However, the conductive member 70 may be configured to be connected to a conductive portion for grounding other than the circuit board 33 without having to be limited thereto.

In the embodiment described above, the conductive member 70 has the motor connection section 80 that is exposed to the fastening surface 35s of the motor yoke 39 and the ground circuit G2 that is capable of grounding the motor yoke 39 is formed when the motor connection section 80 is in contact with the flange portion 77. However, if the conductive member 70 can form a ground circuit for the motor 10, the grounding site on the motor 10 side may be changed as appropriate without having to be the motor yoke 39. Also, this is not ruled out even when the conductive member 70 forms only a ground circuit for a reduction gear.

In the embodiment described above, the accommodating member 30 is an assembly of the first accommodating member 35 that forms the gear accommodating chamber 37 and the second accommodating member 36 that forms the clutch accommodating chamber 42. However, the number of members that constitute the accommodating member 30 or the shape of each of the members may be changed as appropriate without having to be limited thereto.

In the embodiment described above, the rotation detector 63 is disposed at a position in the electromagnetic clutch 25 facing the rotor 51. However, even in the absence of the rotation detector 63, a charge-suppressing structure similar to that in the embodiment described above may be applied in a case where the static electricity with which the wheel gear 41 is charged may be discharged to any electronic component disposed in the accommodating member 30 beyond the air gap.

In the embodiment described above, the electronic control circuit constituting the control device 21 that controls the operation of the actuator device 11, the operation position sensor 23 that detects the operation positions Px of the slide door 1, and the like is mounted on the circuit board 33. However, content of the electronic circuit mounted on the circuit board 33 and the size and shape of the circuit board 33 and the rectangular box portion 32 as a substrate accommodating portion are not limited at all.

Next, technical ideas that can be apprehended from the embodiment described above will be described along with effects.

It is preferable that an actuator device according to an aspect of this disclosure includes a motor that is a driving source, a reduction gear that decelerates rotation of the motor, an accommodating member that accommodates the reduction gear, and a conductive member that is disposed integrally with the accommodating member and is in sliding contact with the reduction gear so that a ground circuit capable of grounding the reduction gear is formed.

According to this configuration, static electric charging can be effectively suppressed by a simple configuration. Since the conductive member is disposed integrally with the accommodating member, an assembly operation therefor can become efficient.

In the actuator device according to the aspect of this disclosure, it is preferable that the conductive member is in sliding contact with an axial-direction end portion of the reduction gear that faces the accommodating member.

In many cases, the axial-direction end portion of the reduction gear is in sliding contact with the accommodating member. Accordingly, the conductive member can be in direct sliding contact with a sliding contact site on the reduction gear side according to this configuration. As a result, the static electric charging can be suppressed more effectively.

In the actuator device according to the aspect of this disclosure, it is preferable that the conductive member is provided with an annular portion that is disposed to face the reduction gear in an axial direction of the reduction gear.

According to this configuration, the reduction gear can be in sliding contact with any part of the annular portion even in a case where tilting occurs in the reduction gear. As a result, the static electric charging can be suppressed more effectively.

In the actuator device according to the aspect of this disclosure, it is preferable that the conductive member is provided with a protruding portion that protrudes from a facing surface on the accommodating member side to the reduction gear side.

According to this configuration, the conductive member can be in sliding contact with the reduction gear more stably. As a result, the static electric charging can be suppressed more effectively.

In the actuator device according to the aspect of this disclosure, it is preferable that the accommodating member is provided with a substrate accommodating chamber that accommodates a circuit board and the conductive member is connected to a conductive portion for grounding that is formed on the circuit board.

According to this configuration, the formation of the ground circuit that uses the conductive member can be facilitated.

In the actuator device according to the aspect of this disclosure, it is preferable that the conductive member can form a ground circuit for the motor with the ground circuit for the reduction gear.

According to this configuration, no wiring handling is required in grounding the motor. Accordingly, the number of components can be reduced and manufacturing processes can be simplified.

In the actuator device according to the aspect of this disclosure, it is preferable that the conductive member is embedded in the accommodating member with an exposed portion by insert molding.

According to this configuration, the conductive member can be held in the accommodating member with ease and reliability. In addition, integrity thereof increases, and thus positioning is facilitated during the assembly. Accordingly, the operation efficiency can be improved.

In the actuator device according to the aspect of this disclosure, it is preferable that the conductive member formed of a metal plate. Accordingly, the conductive member can be formed with ease.

In the actuator device according to the aspect of this disclosure, it is preferable that the electromagnetic clutch that is capable of disconnecting the torque transmission path of the motor is accommodated in the accommodating member.

According to the aspects of this disclosure, the static electric charging can be suppressed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An actuator device comprising:
   a motor that is a driving source;
   a reduction gear that decelerates rotation of the motor;
   an accommodating member that accommodates the reduction gear; and
   a conductive member that is disposed integrally with the accommodating member and is in sliding contact with the reduction gear so that a ground circuit capable of grounding the reduction gear is formed.

2. The actuator device according to claim 1,
   wherein the conductive member is in sliding contact with an axial-direction end portion of the reduction gear that faces the accommodating member.

3. The actuator device according to claim 2,
   wherein the conductive member is provided with an annular portion that is disposed to face the reduction gear in an axial direction of the reduction gear.

4. The actuator device according to claim 2,
   wherein the conductive member is provided with a protruding portion that protrudes from a facing surface on the accommodating member side to the reduction gear side.

5. The actuator device according to claim 1,
   wherein the accommodating member is provided with a substrate accommodating chamber that accommodates a circuit board, and
   wherein the conductive member is connected to a conductive portion for grounding that is formed on the circuit board.

6. The actuator device according to claim 1,
   wherein the conductive member can form a ground circuit for the motor with the ground circuit for the reduction gear.

7. The actuator device according to claim 1,
   wherein the conductive member is embedded in the accommodating member with an exposed portion by insert molding.

8. The actuator device according to claim 1,
   wherein the conductive member is formed of a metal plate.

9. The actuator device according to claim 1,
   wherein an electromagnetic clutch that is capable of cutting a torque transmission path of the motor is accommodated in the accommodating member.

* * * * *